(12) United States Patent
Dennison

(10) Patent No.: US 9,207,891 B1
(45) Date of Patent: Dec. 8, 2015

(54) HIDDEN INFORMATION AT FLUSH PATTERN LOCATIONS FOR PRINT JOBS

(71) Applicant: Carl Michael Dennison, Firestone, CO (US)

(72) Inventor: Carl Michael Dennison, Firestone, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/501,863

(22) Filed: Sep. 30, 2014

(51) Int. Cl.
*G06F 3/12* (2006.01)
*G06K 15/02* (2006.01)

(52) U.S. Cl.
CPC ............ *G06F 3/1243* (2013.01); *G06F 3/1215* (2013.01); *G06F 3/1254* (2013.01); *G06K 15/189* (2013.01); *G06K 15/1856* (2013.01)

(58) Field of Classification Search
CPC .................. H04N 2201/0094; H04N 1/32101; H04N 1/00; H04N 1/00278; H04N 1/405; H04N 2201/3271; G06F 3/1298; G06F 21/608; G06F 3/1204; G06F 3/1229; G06F 3/1288; G06F 3/1208; G06F 3/122
USPC ............. 358/1.15, 1.13, 1.9, 1.14, 1.11, 1.12, 358/3.28; 399/94, 110, 15, 16, 252, 260, 399/262, 39, 40, 45, 75, 88; 345/173, 174, 345/589; 709/219
See application file for complete search history.

(56) References Cited

U.S. PATENT DOCUMENTS

| | | | |
|---|---|---|---|
| 6,594,033 B1 * | 7/2003 | Kujirai et al. ................ 358/1.18 |
| 7,251,046 B2 * | 7/2007 | Mochizuki et al. .......... 358/1.13 |
| 7,304,764 B2 * | 12/2007 | Nishikawa et al. .......... 358/1.18 |
| 7,598,862 B2 * | 10/2009 | Lastinger et al. ............. 340/547 |
| 7,776,980 B2 * | 8/2010 | Mihan et al. .................. 526/172 |
| 7,827,171 B2 * | 11/2010 | Brosseau et al. ............. 707/723 |
| 7,857,420 B2 * | 12/2010 | Reid .............................. 347/35 |
| 7,990,571 B2 * | 8/2011 | Silverbrook et al. .......... 358/1.6 |
| 2002/0067508 A1 * | 6/2002 | Nishikawa et al. .......... 358/1.18 |
| 2003/0007180 A1 * | 1/2003 | Urasawa et al. ............. 358/1.16 |
| 2005/0088701 A1 * | 4/2005 | Uchida et al. ................ 358/3.28 |
| 2008/0079763 A1 * | 4/2008 | Abrott ............................ 347/19 |
| 2010/0195139 A1 * | 8/2010 | Fransazov et al. ........... 358/1.15 |
| 2011/0122433 A1 * | 5/2011 | Klassen ....................... 358/1.15 |
| 2012/0006894 A1 | 1/2012 | Pruden et al. |
| 2012/0229537 A1 | 9/2012 | Ernst et al. |
| 2012/0229823 A1 | 9/2012 | Sato |
| 2013/0076820 A1 | 3/2013 | Chandu et al. |
| 2013/0258361 A1 * | 10/2013 | Qian et al. ..................... 358/1.9 |
| 2013/0265360 A1 * | 10/2013 | Chandu et al. ................. 347/19 |

* cited by examiner

*Primary Examiner* — Negussie Worku (74) *Attorney, Agent, or Firm* — Duft Bornsen & Fettig LLP (57) ABSTRACT

Systems and methods are provided for inserting hidden information into flush patterns. One embodiment is a system comprising a marking engine that includes multiple printheads, an interface that receives print data for a print job, multiple Raster Image Processors (RIPs), and a print controller. The print controller divides the print data into logical pages, inserts printable information into the logical pages that distinguishes each logical page from other logical pages, and transmits the logical pages to the RIPs for rasterization. The print controller determines that a RIP has completed rasterizing a logical page, transmits the rasterized logical page to a Print Verification System (PVS), directs the printheads of the marking engine to print the rasterized logical page onto a physical page, and directs the printheads of the marking engine to apply a flush pattern onto the physical page at the location of the inserted printable information.

20 Claims, 6 Drawing Sheets

HIDDEN INFORMATION AT FLUSH PATTERN LOCATIONS FOR PRINT JOBS

FIELD OF THE INVENTION

The invention relates to the field of printing, and in particular, to flush patterns used by printing systems.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printing system, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

A Print Verification System (PVS) verifies that the physical output of a printer is error-free. Thus, a PVS may scan the printed pages of a job from a production printer, and may compare each printed page to a corresponding rasterized version kept in memory. If there is a discrepancy, such as an errant droplet of ink, the PVS may identify the error and report it for handling by an operator of the printer.

While a PVS is useful for detecting errors in a printed job, a PVS may encounter substantial problems when attempting to review output from a production printer that utilizes parallel processing. For example, some printers include multiple Raster Image Processors (RIPs), and send out batches of pages (one to each RIP) for rasterization by the RIPs. As pages are rasterized by the RIPs, they are sent out to the PVS in their order of completion. This means that while the physical pages of a print job may be received in order at the PVS, the rasterized pages may be received out of order. This situation makes it harder for a PVS to determine which physical page of the job each rasterized page corresponds with, which may result in substantial processing delays.

SUMMARY

Embodiments described herein insert information, such as a page number, into the rasterized version of a page that is sent to a PVS. The information is included on the rasterized page in a location that will later be overwritten with a flush pattern when a printer physically prints the rasterized page. Thus, the information is available to the PVS via the rasterized page, but does not interfere with the appearance of the physically printed pages of the print job.

One embodiment is a system comprising a printer. The printer comprises a marking engine that includes multiple printheads, an interface able to receive print data for a print job, multiple Raster Image Processors (RIPs), and a print controller. The print controller is able to divide the print data into logical pages, to insert printable information into the logical pages that distinguishes each logical page from other logical pages, and to transmit the logical pages to the RIPs for rasterization. The print controller is further able to determine that a RIP has completed rasterizing a logical page, to transmit the rasterized logical page to a Print Verification System (PVS), to direct the printheads of the marking engine to print the rasterized logical page onto a physical page, and to direct the printheads of the marking engine to apply a flush pattern onto the physical page at the location of the inserted printable information.

Another embodiment is a method for facilitating print verification. The method includes receiving print data for a print job, dividing the print data into logical pages, inserting printable information into the logical pages that distinguishes each logical page from other logical pages, transmitting the logical pages to multiple Raster Image Processors (RIPs) for rasterization, determining that a RIP has completed rasterizing a logical page, and transmitting the rasterized logical page to a Print Verification System (PVS). The method also includes directing the printheads of the marking engine to print the rasterized logical page onto a physical page, and directing the printheads of the marking engine to apply a flush pattern onto the physical page at the location of the inserted printable information.

Another embodiment is a system comprising a printer. The printer comprises a marking engine that includes multiple printheads, an interface able to receive print data for a print job, multiple Raster Image Processors (RIPs), and a print controller. The print controller is able to divide the print data into logical pages, to insert printable information into the logical pages that describes the content of the logical pages, and to transmit the logical pages to the RIPs for rasterization. The print controller is further able to determine that a RIP has completed rasterizing a logical page, to transmit the rasterized logical page to a Print Verification System (PVS), to direct the printheads of the marking engine to print the rasterized logical page onto a physical page, and to direct the printheads of the marking engine to apply a flush pattern onto the physical page at the location of the inserted printable information.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
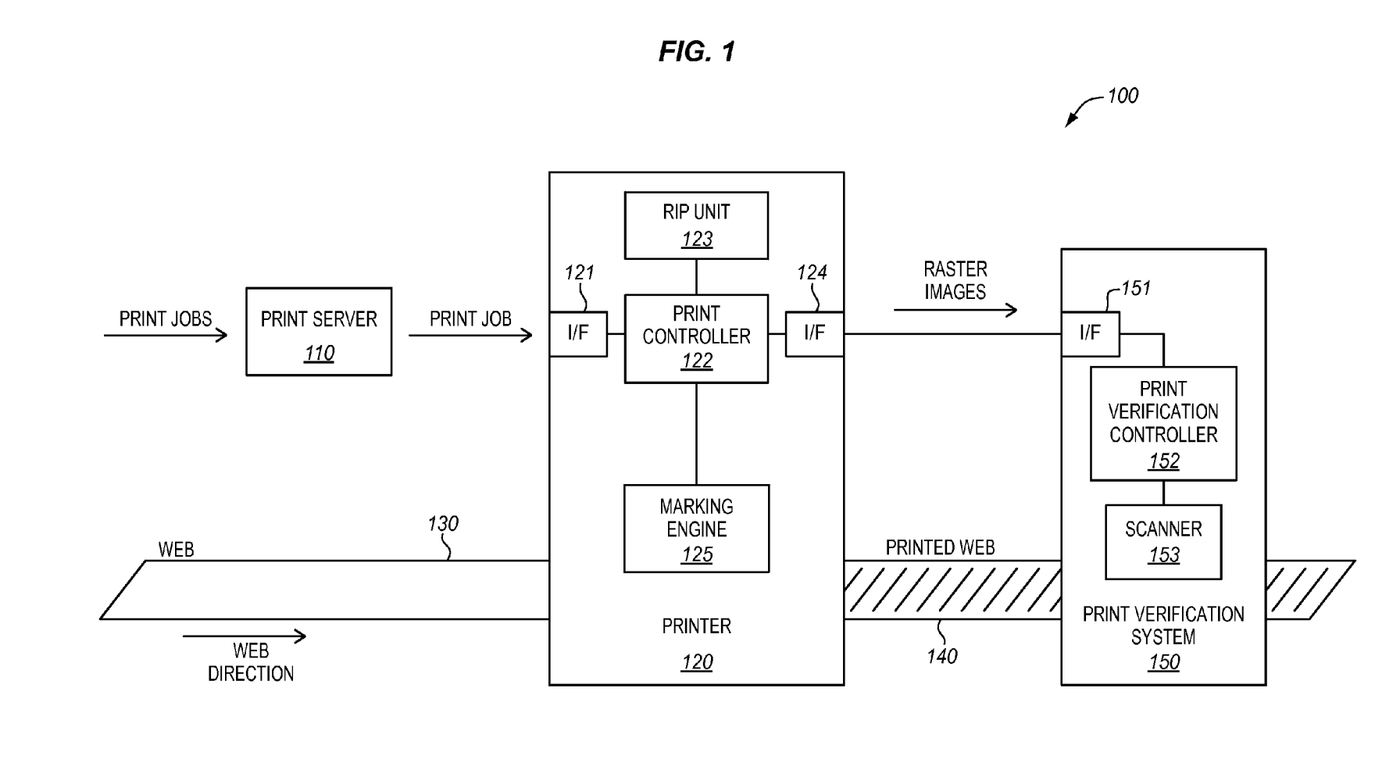
FIG. 1 is a diagram of a printing system 100 in an exemplary embodiment.

FIG. 1 is a diagram of a printing system 100 in an exemplary embodiment. Printing system 100 includes print server 110, which receives print jobs from users (e.g., in a Page Description Language (PDL) format) and provides the print jobs to printer 120 for printing (e.g., in an Intelligent Printer Data Stream (IPDS) format). Printer 120 marks a web of print media 130 based on the print data for received print jobs, resulting in printed web 140. Printer 120 also transmits a rasterized version of the print job to Print Verification System (PVS) 150. PVS 150 compares the physical pages from printed web 140 to rasterized pages received from printer 120, and determines whether there are any discrepancies that indicate a printing error. This quality control process ensures that print jobs created by printer 120 are thoroughly checked before delivery to a customer.

Figure 4:
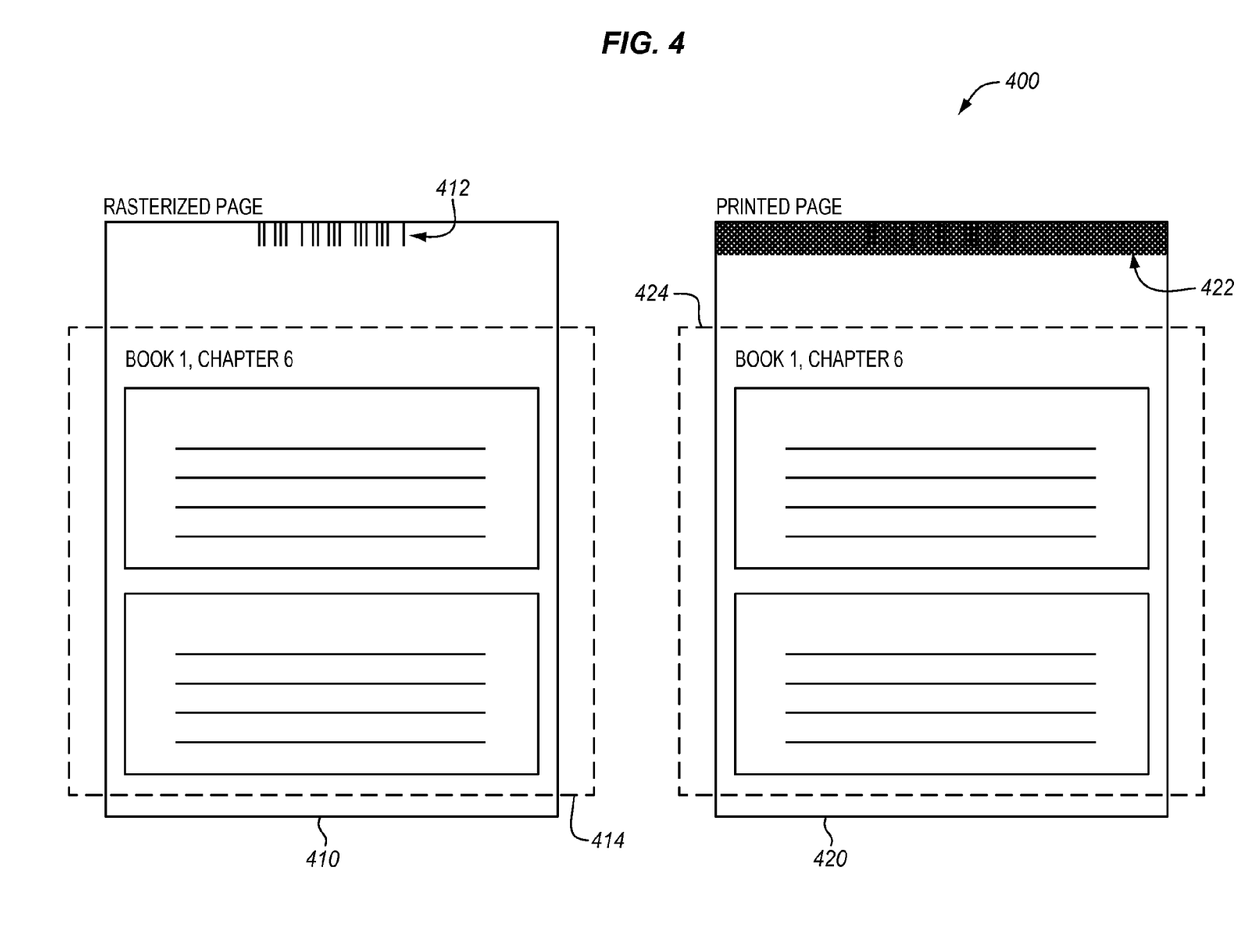
FIG. 4 is a diagram illustrating exemplary rasterized and physical pages in an exemplary embodiment.

Printing system 100 has been enhanced to insert printable information into rasterized pages at locations that will be covered by flush patterns when the pages are printed (as shown in FIG. 4, described in further detail below). As used herein, a flush pattern is a location on a page where droplets of marking material such as ink are "flushed" onto the physical page by printer 120 to ensure that they do not dry on the printhead and impact print quality. Flush patterns often extend across the entire width of a page, and include, for example, horizontal flush lines, staggered patterns, etc. In some embodiments, at least one flush pattern is applied per page.

Since flush patterns are applied by printer 120 after rasterization during printing, the inserted information is visible on the rasterized logical pages, yet remains hidden by the flush patterns on the corresponding printed versions of those pages. In this manner, the inserted information may be used to correlate rasterized pages with printed pages (e.g., by indicating the page number for each rasterized page), without altering the appearance of the printed pages.

In this embodiment, printer 120 includes interface (I/F) 121, which receives print data for a job from print server 110. Print controller 122 handles the overall operations of printer 120 by dividing received print jobs into logical pages, inserting information into the logical pages, and providing the logical pages to Raster Image Processor (RIP) unit 123 for processing. RIP unit 123 includes multiple RIPs, which each rasterize individual logical pages of data at a time. As each logical page is rasterized by the RIPs of RIP unit 123, print controller 122 transmits those rasterized pages via I/F 124 (e.g., an Ethernet connection, Universal Serial Bus (USB) connection, a FireWire connection, etc.) to PVS 150.

Print controller 122 directs the printheads of marking engine 125 to print each rasterized logical page, and further directs the printheads to apply flush patterns at the same locations as the inserted information. This causes the flush patterns to obscure/cover the inserted information, making the inserted information indistinguishable from an opaque flush pattern on the printed page.

PVS 150 receives rasterized logical pages via I/F 151, and PVS controller 152 analyzes the inserted information in the rasterized pages to facilitate the verification process for printed pages that have been scanned by scanner 153. Controllers 122 and 152 may be implemented as custom circuitry, as processors executing programmed instructions, etc. The particular arrangement, number, and configuration of components described herein is exemplary and non-limiting.

Figure 2:
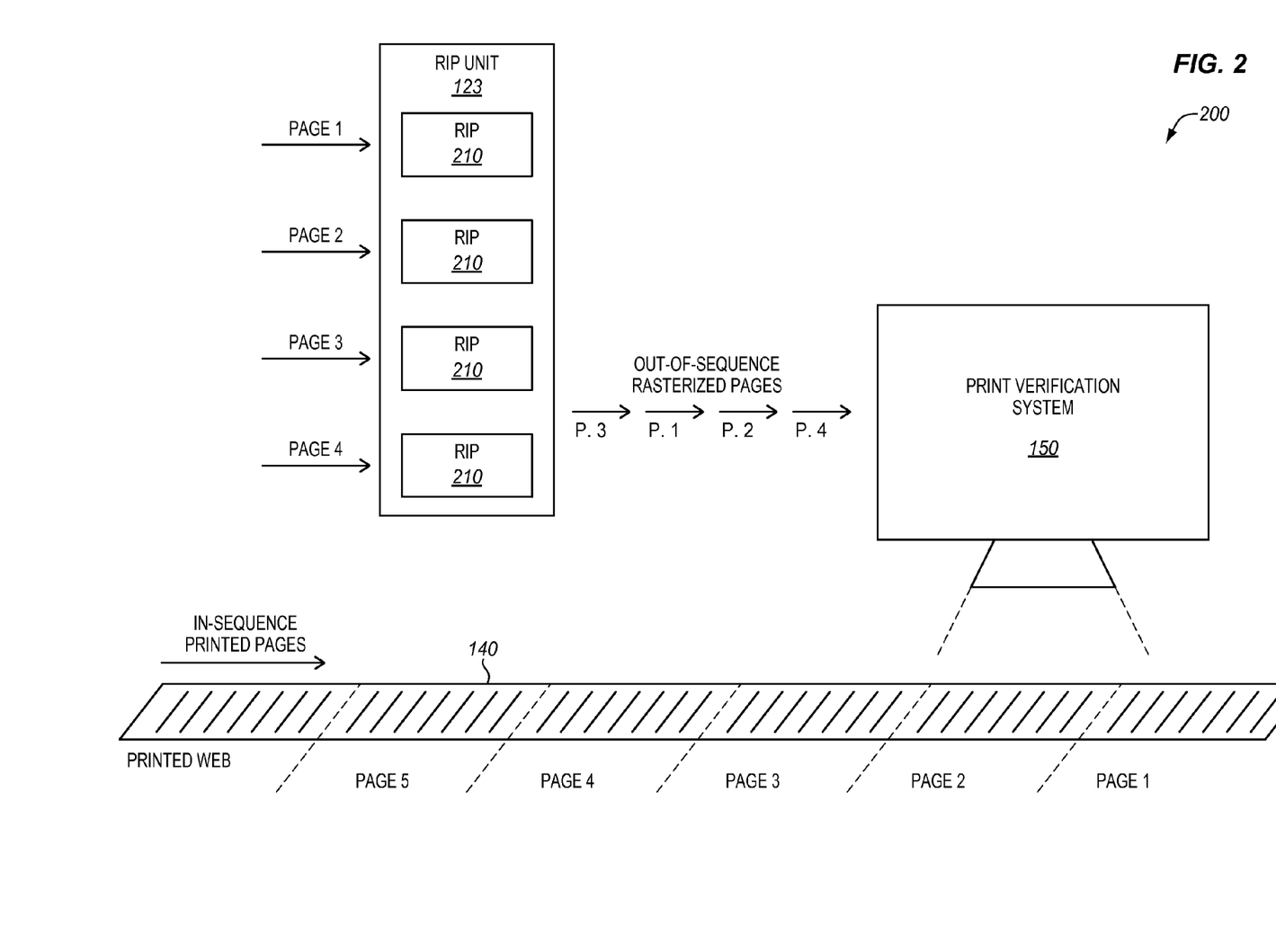
FIG. 2 is a diagram illustrating the delivery of physical pages and rasterized pages to a print verification system in an exemplary embodiment.

FIG. 2 is a diagram 200 illustrating the delivery of physical pages and rasterized pages to a print verification system in an exemplary embodiment. FIG. 2 illustrates problems that may be encountered when attempting to utilize a PVS in combination with parallel processing techniques. Specifically, FIG. 2 shows that when many RIPs 210 are operating in parallel to each process a different logical page, rasterized logical pages may be sent to a print verification system such as PVS 150 in an order that is out-of-sequence. This creates a problem, because it makes it much harder for PVS 150 to link rasterized logical pages with their corresponding physical versions (which in this embodiment are received in their intended print order). The steps of method 300, described below, are performed to overcome this issue.

Illustrative details of the operation of printing system 100 will be discussed with regard to FIG. 3. Assume, for this embodiment, that a user has provided a print job in a Page Description Language (PDL) format to print server 110. Print server 110 determines, based on a job ticket for the print job, that the output of the job should be verified by PVS 150. Therefore, print server 110 transmits the print job to printer 120 for printing and verification.

Figure 3:
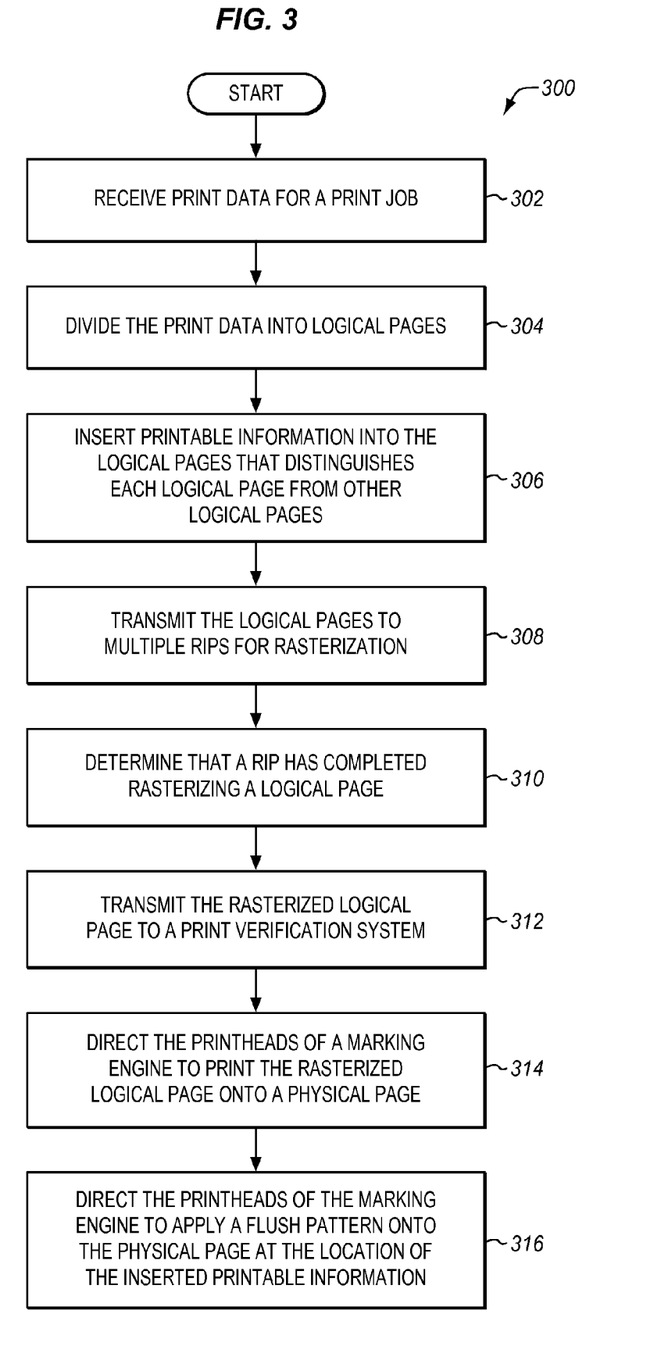
FIG. 3 is a flowchart illustrating a method for operating a printing system in an exemplary embodiment.

FIG. 3 is a flowchart illustrating a method 300 for operating a printing system in an exemplary embodiment. The steps of method 300 are described with reference to printing system 100 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, I/F 121 of printer 120 receives print data for the print job. The print data may arrive in any suitable format, such as a PDL (e.g., Postscript, Portable Document Format (PDF), etc.) a print data stream, etc. Once the print data has been received, print controller 122 divides the print data into logical pages in step 304. Boundaries between logical pages may be identified by print controller 122 based on special characters or tags within the print data, may be identified based on a known size of each logical page, or any other suitable technique.

In step 306, print controller 122 inserts printable information into the logical pages. The printable information facilitates the print verification process, in this embodiment, by distinguishing a logical page from other logical pages. For example, the printable information inserted into each logical page may comprise a page number represented by text, a barcode, a symbol, etc. The printable information may comprise, for example, raster data or PDL print data.

After the printable information has been inserted into the logical pages of the print job, print controller 122 transmits the logical pages to the multiple RIPs of RIP unit 123 for parallel processing in step 308. Specifically, each logical page is sent to a different RIP of RIP unit 123. Since logical pages vary based on their graphic and textual contents, the rasterization time for each logical page is also likely to vary. This in turn means that the logical pages are often rasterized out of sequence. Fortunately, each of the logical pages includes printable information from step 306 that distinguishes it from other logical pages, meaning that the printable information may be used to correlate each logical page with a corresponding physical page marked by printer 120.

Eventually, print controller 122 determines that a RIP has completed rasterizing a logical page in step 310, and, in step 312 print controller 122 transmits the rasterized logical page to I/F 151 of PVS 150. Once PVS 150 has access to the rasterized logical page, it is capable of verifying the corresponding physical page. Thus, print controller 122 further directs the printheads of marking engine 125 to print the rasterized logical page onto a physical page for verification in step 314.

When the rasterized page is printed, the physical printed page will include the information inserted in step 306. This information may be undesirable to an end user, as it may alter the appearance of the final product delivered to the user. Thus, to conceal/obscure the inserted information, print controller 122 directs the printheads of marking engine 125 to apply a flush pattern onto the physical page at the location of the inserted printable information in step 316. Since the flush pattern covers the same location as the inserted information, the flush pattern obscures the inserted information. This makes the inserted information indistinguishable from the flush pattern itself, effectively rendering it invisible to an end user reviewing the printed job.

Method 300 provides a benefit over prior systems, because it provides information in rasterized logical pages that helps to facilitate print verification. At the same time, the inserted information is hidden within a flush pattern from the printer, meaning that the pages of the print job, as printed, appear indistinguishable from their original versions.

FIG. 4 is a diagram 400 illustrating exemplary rasterized and physical pages in an exemplary embodiment. As shown in FIG. 4, the rasterized version of a page 410 and the physically printed version of a page 420 are displayed side-by-side for comparison. In this embodiment, a PVS is used to compare a specific portion of each page where print data is expected to be found. This portion is known as a verification area/zone, and is represented by elements 414 and 424. FIG. 4 also illustrates that rasterized page 410 includes a barcode 412 indicating a page number. This inserted information is accessible to the PVS by reviewing a top portion/header of each rasterized page. Furthermore, this inserted information is not visible on the printed version of the page, because it is hidden in the same location as a flush line 422.

In further embodiments, the information inserted into each logical page may be any information that facilitates the verification operations of a PVS. For example, the information inserted into each logical page may indicate the expected contents for a logical page, such as a number on the logical page. If the number on the logical page and the inserted information for the logical page do not match, this may indicate that the print data itself has an error.

Examples

In the following examples, additional processes, systems, and methods are described in the context of a print verification system that verifies the cash value of checks that have been printed.

In this embodiment, a continuous-forms printer receives a print job from a print server in an IPDS format. According to the print job, each logical page defines two checks for printing. The print job also includes a job ticket indicating the currency value/amount that should be printed on each check.

Figure 5:
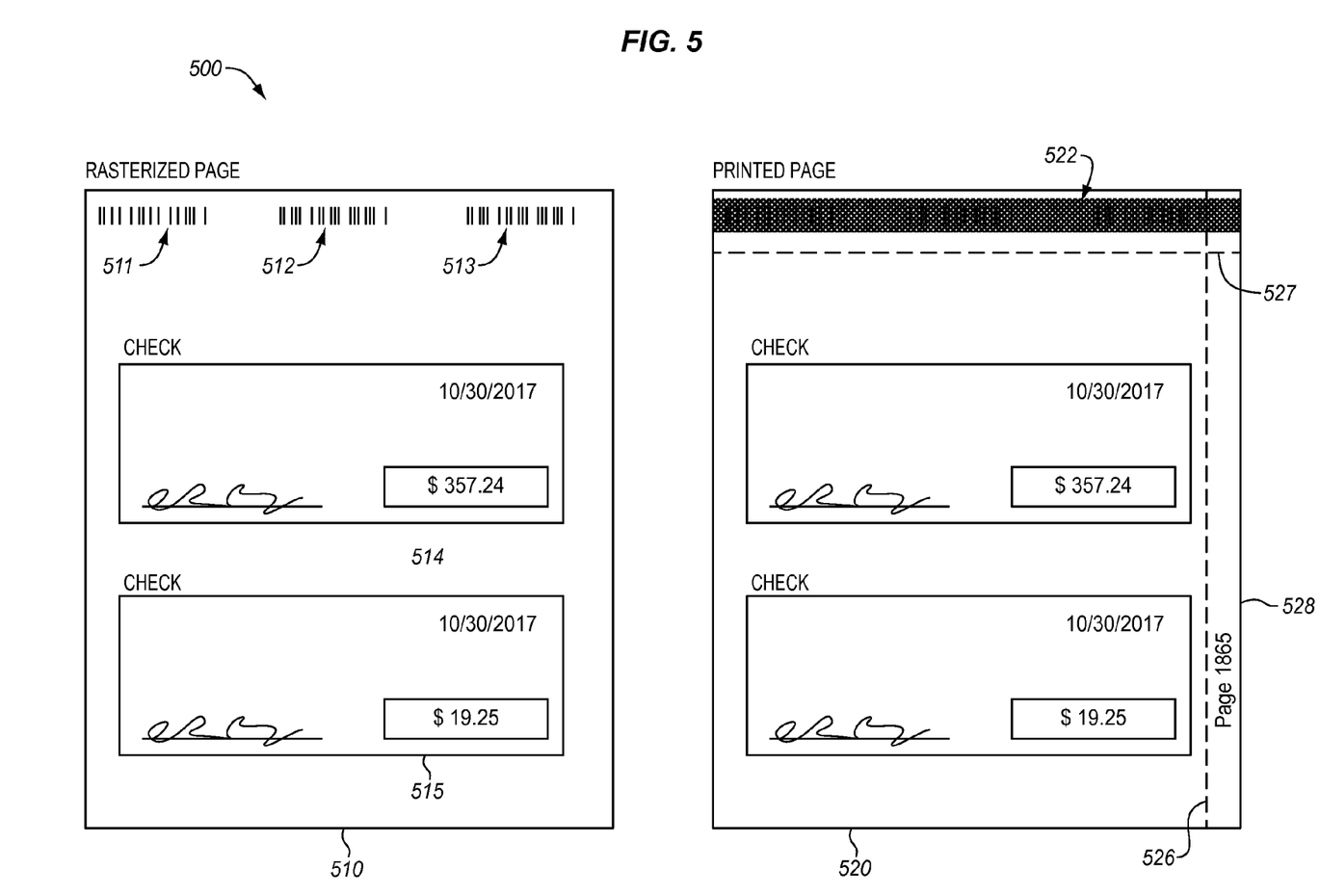
FIG. 5 is a diagram illustrating further exemplary rasterized and physical pages in an exemplary embodiment.

A print controller at the printer reviews the job ticket, and determines which checks are included on each logical page, based on the order of the logical pages and the number of checks on each logical page (e.g., the first logical page includes checks 1-2, the second logical page includes checks 3-4, and so on). The print controller then inserts three barcodes (511, 512, and 513) into each logical page at the header of the page. The first barcode is a page number for the logical page. The second barcode is a value for the first check on the logical page as indicated by the job ticket, and the third barcode is a value for the second check on the logical page as indicated by the job ticket. Once this information has been inserted into a logical page, the logical page is queued for rasterization by a RIP of the printer.

As the RIPs complete rasterizing each logical page, the print controller operates an Ethernet interface to transmit the rasterized page to a PVS. The print controller may further direct the PVS to compare the check amounts in the rasterized page to the check amounts listed in the corresponding physical page.

If the marking engine of the printer is currently idle, then the print controller prints a physical version of the page using raster data for the page. Alternatively, if the printer is currently actively printing a page, then the print controller spools the rasterized page for later printing by a marking engine. Once the rasterized page has been printed, it is removed from memory.

Whenever a physical page is printed using the rasterized page, the print controller directs the printheads to add a flush line onto the header of the physical page being printed. The print controller further directs the printheads to add cutter marks 526 and 527 to the printed page. The cutter marks indicate what portions of the page will be cut off after printing and discarded. In this embodiment, the verification zone used corresponds to the portion of the physical page that remains after cutting has been performed. This means that, when comparing the scanned page to the rasterized page on a pixel by pixel basis, the PVS will ignore locations that will be cut. These marks are not part of the rasterized logical page image for the job, but rather are additional marks that are added onto the physical page by the print controller. The print controller also directs the printheads to add a label 528 in a margin of the page.

Once the PVS has received a rasterized page, it analyzes a top portion of the rasterized page to identify a barcode (or a sequence of dots) that indicates the page number, and stores the rasterized pages in memory, sequenced by page number. The PVS also identifies the amounts of the checks as indicated by barcodes 512 and 513, and associates these amounts with the rasterized page stored in memory at the PVS.

Upon receiving a physical page for verification, the PVS operates a scanner to take a picture of the page, then the PVS reviews label 528 to identify the page number of the physical page. A print controller at the PVS proceeds to retrieve the corresponding rasterized page, and to initiate a pixel-by-pixel comparison of the pages to confirm that there were no physical printing errors on the page. If an error is detected (e.g., if a pixel on the scanned page does not match a pixel on the printed page), the PVS reports the error to a print shop operator via a Graphical User Interface (GUI). The operator then decides whether to re-print the page with the error (or the entire job), as well as whether to halt printing.

The controller at the PVS also takes an additional verification step to ensure that the amounts of each check are correct. Specifically, the PVS operates Optical Character Recognition (OCR) algorithms to confirm that the amounts of each check on the physical page match the amounts indicated in the barcodes. This verification step provides additional protection in ensuring that checks of the wrong size are not sent out to customers.

Figure 6:
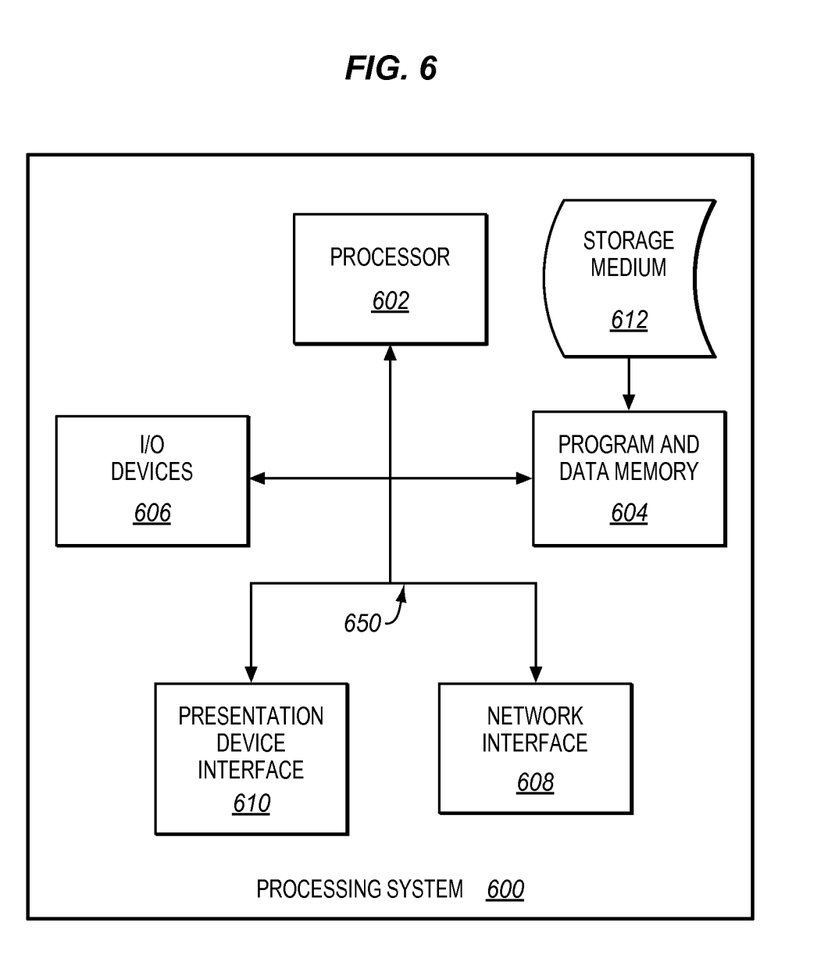
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof.

I claim:

1. A system comprising:
 a printer comprising:
  a marking engine that includes multiple printheads;
  an interface configured to receive print data for a print job;
  multiple Raster Image Processors (RIPs); and
  a print controller configured to divide the print data into logical pages, to insert printable information into the logical pages that distinguishes each logical page from other logical pages, and to transmit the logical pages to the RIPs for rasterization,
   wherein the print controller is further configured to determine that a RIP has completed rasterizing a logical page, to transmit the rasterized logical page to a Print Verification System (PVS), to direct the printheads of the marking engine to print the rasterized logical page onto a physical page, and to direct the printheads of the marking engine to apply a flush pattern onto the physical page at the location of the inserted printable information.

2. The system of claim 1, wherein:
the print controller is further configured to insert printable information comprising a page number.

3. The system of claim 1, wherein:
the print controller is further configured to identify a location on the physical page that will be cut away after printing, and to insert the printable information at the location that will be cut away.

4. The system of claim 1, wherein:
the print controller is further configured to direct the printheads of the marking engine to apply the flush pattern as a flush line across the width of the physical page that obscures the printable information.

5. The system of claim 1, wherein:
the order that the rasterized logical pages are completed by the RIPs is different than the print order of the rasterized logical pages; and
the print controller is further configured to transmit rasterized logical pages to the PVS in the order that they are completed by the RIPs.

6. The system of claim 1, wherein:
the print controller is further configured to insert the printable information into a header for each logical page.

7. The system of claim 1, wherein:
the print controller is further configured to identify a verification area for each logical page, wherein the verification area is the portion of a logical page that is compared by the PVS to a physical page, and
the print controller is further configured to insert the printable information outside of the verification area of each logical page.

8. A method comprising:
receiving print data for a print job;
dividing the print data into logical pages;
inserting printable information into the logical pages that distinguishes each logical page from other logical pages;
transmitting the logical pages to multiple Raster Image Processors (RIPs) for rasterization;
determining that a RIP has completed rasterizing a logical page;
transmitting the rasterized logical page to a Print Verification System (PVS);
directing the printheads of the marking engine to print the rasterized logical page onto a physical page; and
directing the printheads of the marking engine to apply a flush pattern onto the physical page at the location of the inserted printable information.

9. The method of claim 8, wherein:
the printable information comprises a page number.

10. The method of claim 8, further comprising:
identifying a location on the physical page that will be cut away after printing; and
inserting the printable information at the location that will be cut away.

11. The method of claim 8, further comprising:
directing the printheads of the marking engine to apply the flush pattern as a flush line across the width of the physical page that obscures the printable information.

12. The method of claim 8, wherein:
the order that the rasterized logical pages are completed by the RIPs is different than the print order of the rasterized logical pages, and the method further comprises:
transmitting rasterized logical pages to the PVS in the order that they are completed by the RIPs.

13. The method of claim 8, further comprising:
inserting the printable information into a header for each logical page.

14. The method of claim 8, further comprising:
identifying a verification area for each logical page, wherein the verification area is the portion of a logical page that is compared by the PVS to a physical page; and
inserting the printable information outside of the verification area of each logical page.

15. A system comprising:
a printer comprising:
  a marking engine that includes multiple printheads;
  an interface configured to receive print data for a print job;
  multiple Raster Image Processors (RIPs); and
  a print controller configured to divide the print data into logical pages, to insert printable information into the logical pages that describes the content of the logical pages, and to transmit the logical pages to the RIPs for rasterization,
  wherein the print controller is further configured to determine that a RIP has completed rasterizing a logical page, to transmit the rasterized logical page to a Print Verification System (PVS), to direct the printheads of the marking engine to print the rasterized logical page onto a physical page, and to direct the printheads of the marking engine to apply a flush pattern onto the physical page at the location of the inserted printable information.

16. The system of claim 15, wherein:
the print controller is further configured to insert printable information comprising a number that indicates an amount listed on the logical page.

17. The system of claim 16, wherein:
each logical page includes print data that defines a check; and
the number indicates a currency value of the check.

18. The system of claim 15, wherein:
the print controller is further configured to direct the PVS to compare the printable information in the rasterized logical page to contents of the physical page that are described by the printable information.

19. The system of claim 15, wherein:
the order that the rasterized logical pages are completed by the RIPs is different than the print order of the rasterized logical pages; and
the print controller is further configured to transmit rasterized logical pages to the PVS in the order that they are completed by the RIPs.

20. The system of claim 15, wherein:
the print controller is further configured to direct the printheads of the marking engine to apply the flush pattern as a flush line across the width of the physical page that obscures the printable information.

* * * * *